ns(12) United States Patent
Muramatsu (10) Patent No.: US 7,883,812 B2
(45) Date of Patent: Feb. 8, 2011

(54) FUEL CELL SYSTEM AND TRANSPORTATION EQUIPMENT INCLUDING THE SAME

(75) Inventor: Yasuyuki Muramatsu, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 679 days.

(21) Appl. No.: 11/937,026

(22) Filed: Nov. 8, 2007

(65) Prior Publication Data

US 2008/0107942 A1 May 8, 2008

(30) Foreign Application Priority Data

Nov. 8, 2006 (JP) .............................. 2006-302445

(51) Int. Cl.
*H01M 8/04* (2006.01)
(52) U.S. Cl. ...................................... 429/447; 429/450
(58) Field of Classification Search ................. 429/447, 429/448, 449, 450, 451
See application file for complete search history.

(56) References Cited

U.S. PATENT DOCUMENTS 6,821,659 B2 * 11/2004 Surampudi et al. .......... 429/408
7,435,503 B2 * 10/2008 Cohen et al. ................. 429/448
2006/0024552 A1 * 2/2006 Fujita et al. .................... 429/34

FOREIGN PATENT DOCUMENTS

| JP | 2000-324617 A | 11/2000 |
| JP | 2004-214004 A | 7/2004 |
| JP | 2004-265787 A | 9/2004 |
| JP | 2005-209569 A | 8/2005 |
| JP | 2006-032210 A | 2/2006 |
| JP | 2006-147486 A | 6/2006 |
| JP | 2004-241169 | * 8/2010 |
| WO | 99/44249 A1 | 9/1999 |
| WO | 2005/096420 A2 | 10/2005 |

* cited by examiner

*Primary Examiner*—Stephen J. Kalafut
(74) *Attorney, Agent, or Firm*—Keating & Bennett, LLP (57) ABSTRACT

A fuel cell system is capable of shifting to a normal operation quickly, and can be provided in transportation equipment such as a motorbike. The fuel cell system includes a cell stack which has a plurality of fuel cells; an aqueous solution tank which holds aqueous methanol solution to be supplied to the cell stack; a water pump which supplies water to the aqueous solution tank; an electric current detection circuit which detects an electric current value of the cell stack; and CPU which controls the fuel cell system. The CPU drives the water pump, and thereby starts a liquid amount adjustment if the electric current value detected by the electric current detection circuit becomes not lower than a predetermined value after power generation of the cell stack is started.

9 Claims, 5 Drawing Sheets

FUEL CELL SYSTEM AND TRANSPORTATION EQUIPMENT INCLUDING THE SAME

BACKGROUND OF THE INVENTION

1. Field of the Invention

The present invention relates to fuel cell systems and transportation equipment including a fuel cell system, and more specifically to a fuel cell system which holds aqueous fuel solution, and to transportation equipment including the system.

2. Description of the Related Art

JP-A 2006-004680 discloses a fuel cell system in which an aqueous solution container is supplied with water from a container which holds the water.

Generally in such a fuel cell system as described above, water is supplied to the aqueous solution container in order to bring the liquid level in the aqueous solution container to a predetermined liquid level. During power generation in the fuel cell, the aqueous solution container is supplied with a mixture of aqueous fuel solution and gases such as carbon dioxide which has resulted from the power generation and a gaseous form of fuel which has resulted from evaporation in the course of circulatory supply, for example, of the aqueous fuel solution. Consequently, bubbles are produced in the aqueous fuel solution held in the aqueous solution container. In this case, the water supply to the aqueous solution container in order to bring the liquid level to the predetermined level is based on a level of bubbly liquid in the aqueous solution container which contains the bubbles.

Also, in such a fuel cell system like the one described above, it is likely that aqueous fuel solution has a high temperature and a uniform concentration if there has not been a long time passed since the last stoppage of power generation, for example, and in such a case, it will be possible to quickly shift to normal operation, i.e., the state where constant power generation is possible. In other words, it is highly probable that the state of aqueous fuel solution is ready for power generation, and that it is possible to shift to normal operation quickly.

However, in the conventional art, if bubbles are not present in the aqueous fuel solution held in the aqueous solution container, water is supplied to the aqueous solution container based on the actual level of the liquid which does not contain bubbles. In other words, a greater amount of water is supplied when bubbles are not present, than when bubbles are present. Since a large amount of water is supplied to the aqueous solution container if bubbles are not present, the state of the aqueous fuel solution is changed even if the aqueous fuel solution was ready for power generation at the time when power generating operation was stopped, and this poses a problem that a long time is necessary before the system shifts to normal operation.

SUMMARY OF THE INVENTION

In order to overcome the problems described above, preferred embodiments of the present invention provide a fuel cell system which can shift to normal operation quickly, as well as, transportation equipment including such a system.

According to a preferred embodiment of the present invention, a fuel cell system includes a fuel cell; an aqueous solution container arranged to hold aqueous fuel solution to be supplied to the fuel cell; a water supply arranged to supply water to the aqueous solution container; a bubble detector arranged to detect information regarding presence of bubbles in the aqueous fuel solution in the aqueous solution container; and a controller arranged to control the water supply based on information obtained by the bubble detector.

According to a preferred embodiment of the present invention, the controller controls the water supply based on information regarding presence of bubbles which is obtained by the bubble detector, whereby it is possible to supply water to the aqueous solution container when bubbles are present in the aqueous fuel solution which is held in the aqueous solution container. By supplying water when bubbles are present as described, it becomes possible to reduce the amount of water to be supplied to the aqueous solution container in order to bring the liquid level in the aqueous solution container to a target level, as compared to a case where water is supplied when bubbles are not present. Therefore, it becomes possible to reduce changes in the state of aqueous fuel solution as compared to the case where water is supplied when bubbles are not present, and it becomes possible to quickly shift to normal operation where the fuel cell can generate power constantly, if the state of aqueous fuel solution is ready or nearly ready for power generation. In a fuel cell system where water is supplied to the aqueous solution container in order to bring the liquid level in the aqueous solution container to a predetermined liquid level, a large amount of water is supplied to the aqueous solution container if bubbles are not present, based on the liquid level (actual liquid level) of the aqueous fuel solution. This presents a risk that the state of aqueous fuel solution which is ready for power generation will be changed drastically. Preferred embodiments of the present invention, which make it possible to supply water to the aqueous solution container when bubbles are present and to reduce state changes in the aqueous fuel solution which is ready for power generation, can be used suitably for a fuel cell system in which water is supplied to the aqueous solution container in order to bring the liquid level in the aqueous solution container to a predetermined liquid level.

It should be noted here that in the present specification, the term "liquid level in the aqueous solution container" means a level of liquid which contains bubbles if the bubbles are present in aqueous fuel solution held in the aqueous solution container.

Preferably, the fuel cell system further includes a liquid level detector arranged to detect a liquid level in the aqueous solution container, and the controller controls the water supply, if the bubble detector obtains predetermined information regarding presence of the bubbles, so as to bring a liquid level in the aqueous solution container to a predetermined level based on a result of detection by the liquid level detector. In this case, water is supplied to the aqueous solution container so as to bring the liquid level in the aqueous solution container to a predetermined liquid level, if the bubble detector has obtained predetermined information which indicates presence of a sufficient amount of bubbles. This arrangement makes it possible to prevent shortage of aqueous fuel solution in the aqueous solution container while reducing state changes in the aqueous fuel solution. Therefore, it becomes possible to perform power generation smoothly in the fuel cell. Further, since water is supplied to the aqueous solution container so as to achieve a predetermined liquid level with a sufficient amount of bubbles present, it becomes possible to prevent such a problem as an excessively high liquid level which would be caused when water is supplied when bubbles are not present. In other words, it becomes possible to prevent bubbles from overflowing out of the aqueous solution container, which can happen if bubbles are produced when the actual liquid level is equal to the predetermined liquid level. On the other hand, the amount of water to be supplied to the aqueous solution container is reduced (including a case where water is not supplied), i.e., is smaller than the uncompensated amount which is the amount to be supplied if bubbles are not present, until the bubble detector obtains predetermined information which indicates presence of a sufficient amount of bubbles. This arrangement makes it possible to reduce state changes in aqueous fuel solution.

It should be noted here that in the present specification, the term "uncompensated amount of water" means an amount of water to be supplied to the aqueous solution container until a target liquid level is reached when bubbles are not present in aqueous fuel solution held in the aqueous solution container.

Further preferably, the controller causes the water supply to start supplying water to the aqueous solution container if the bubble detector obtains the predetermined information. In this case, water supply to the aqueous solution container is started if the bubble detector has obtained predetermined information which indicates presence of a sufficient amount of bubbles. By starting water supply after a sufficient amount of bubbles have been produced as described, it becomes possible to further reduce the amount of water to be supplied to the aqueous solution container, and therefore to reduce state changes in the aqueous fuel solution more reliably.

Further, preferably, the bubble detector obtains the information regarding presence of bubbles in the aqueous solution container based on at least one detection result of an output current from the fuel cell, an elapsed time since the fuel cell has started power generation, a temperature difference in the aqueous fuel solution from a power generation start, a concentration difference in the aqueous fuel solution from the power generation start, and an amount of a high-concentration fuel supplied to the aqueous solution container since the power generation start. This enables the bubble detector to detect presence of bubbles smoothly.

Preferably, the fuel cell system further includes a temperature detector arranged to detect a temperature of the aqueous fuel solution, and the controller controls the water supply based on information obtained by the bubble detector if a result of detection by the temperature detector before a power generation start is not lower than a threshold value. If the aqueous fuel solution is warm, it is likely that the aqueous fuel solution is ready for power generation. According to a preferred embodiment of the present invention, if a result of detection by the temperature detector before starting power generation is not lower than a threshold value which represents a temperature higher than a normally anticipated ambient temperature, the water supply is controlled based on information obtained by the bubble detector. As described, if the state of aqueous fuel solution is ready or nearly ready for power generation, it is possible to reduce state changes of the aqueous fuel solution by supplying water to the aqueous solution container when bubbles are present, and to shift to normal operation quickly. On the other hand, if the result of detection by the temperature detector is lower than the threshold value, i.e., if it is unlikely that the aqueous fuel solution is ready for power generation, then it is possible to shift to normal operation reliably by supplying water to the aqueous solution container.

Further preferably, the fuel cell system further includes an instruction unit arranged to issue a power generation start command of the fuel cell and a time measuring unit arranged to measure a time from a previous power generation shutdown to a current issuance of the power generation start command by the instruction unit. With this arrangement, the controller controls the water supply based on information obtained by the bubble detector if a result of measurement by the time measuring unit is within a predetermined time. If the time from the previous power generation shutdown is short, it is likely that the aqueous fuel solution is ready for power generation. According to preferred embodiments of the present invention, if a result of time measurement by the time measuring unit is within a predetermined time, the water supply is controlled based on information obtained by the bubble detector. As described, if the state of aqueous fuel solution is ready or nearly ready for power generation, it is possible to reduce state changes of the aqueous fuel solution by supplying water to the aqueous solution container when bubbles are present, and to shift to normal operation quickly. On the other hand, if the result of time measurement by the time measuring unit is longer than the predetermined time, i.e., if it is unlikely that the aqueous fuel solution is ready for power generation, it is then possible to shift to normal operation reliably by supplying water to the aqueous solution container conventionally.

Further, preferably, the fuel cell system further includes a concentration detector arranged to detect a concentration of the aqueous fuel solution; an instruction unit arranged to issue a power generation start command of the fuel cell; a time measuring unit arranged to measure a time from a previous power generation shutdown to a current issuance of the power generation start command by the instruction unit; and a concentration adjusting unit arranged to adjust a concentration of the aqueous fuel solution before a power generation start based on a result of detection by the concentration detector at the previous power generation shutdown if a result of time measurement by the time measuring unit is within a predetermined time. In this case, if the result of time measurement by the time measuring unit is within the predetermined time, the concentration adjusting unit adjusts the concentration of aqueous fuel solution before starting power generation, based on a concentration which was detected by the concentration detector at the time of previous power generation shutdown. If the elapsed time from the previous power generation shutdown is within a predetermined time, it is possible to assume that the concentration at the time of previous power generation shutdown is equal to the current concentration, and therefore it is simple, without making a concentration detection of the aqueous fuel solution, to adjust the concentration of aqueous fuel solution to a value suitable for power generation before starting power generation. As described, it is possible to improve power generation efficiency of the fuel cell by adjusting the concentration of aqueous fuel solution, and therefore it is possible to shift to normal operation more quickly.

Preferably, the fuel cell system further includes a temperature detector arranged to detect a temperature of the aqueous fuel solution, and the controller controls the water supply based on information obtained by the bubble detector if a result of detection by the temperature detector after a concentration adjustment by the concentration adjusting unit but before a power generation start of the fuel cell is not lower than a threshold value. In other words, a determination is made as to whether or not to control the water supply based on information obtained by the bubble detector, and the determination is based on a result of detection made by the temperature detector after the concentration adjustment but before starting power generation of the fuel cell. Since the concentration adjustment can change the temperature of aqueous fuel solution, a result of detection by the temperature detector after the concentration adjustment but before starting power generation is used, whereby it becomes possible to appropriately determine whether or not the water supply should be controlled based on information obtained by the bubble detector.

According to another preferred embodiment of the present invention, a fuel cell system includes a fuel cell; an aqueous solution container arranged to hold aqueous fuel solution to be supplied to the fuel cell; a water supply arranged to supply water to the aqueous solution container; and a controller arranged to control the water supply so that the supply of water by the water supply is started after bubbles are produced in the aqueous fuel solution in the aqueous solution container.

According to a preferred embodiment of the present invention, water supply to the aqueous solution container is started after bubbles have been produced in aqueous fuel solution in the aqueous solution container. This arrangement makes it possible to reduce the amount of water to be supplied to the aqueous solution container in order to bring the liquid level in the aqueous solution container to a target level as compared to a case where water is supplied when bubbles are not present. Therefore, it becomes possible to reduce changes in the state of aqueous fuel solution as compared to the case where water is supplied when bubbles are not present, and it becomes possible to quickly shift to normal operation where the fuel cell can generate power constantly, if the state of aqueous fuel solution is ready or nearly ready for power generation.

Desirably, transportation equipment should become stably operable as quickly as possible. According to the fuel cell system provided by preferred embodiments of the present invention, it is possible to shift to normal operation quickly and to drive system components and the transportation equipment quickly and stably if the state of aqueous fuel solution is ready or nearly ready for power generation. Therefore, the fuel cell system according to preferred embodiments of the present invention can be used suitably for transportation equipment.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described, with reference to the drawings.

The present preferred embodiment preferably is a fuel cell system 100 according to the present invention that is provided in a motorbike 10 as an example of transportation equipment.

The description will first cover the motorbike 10. It is noted that the terms left and right, front and rear, up and down as used in the present preferred embodiment of the present invention are determined from the normal state of riding, i.e., as viewed by the driver sitting on the driver's seat of the motorbike 10, with the driver facing toward a handle 24.

Figure 1:
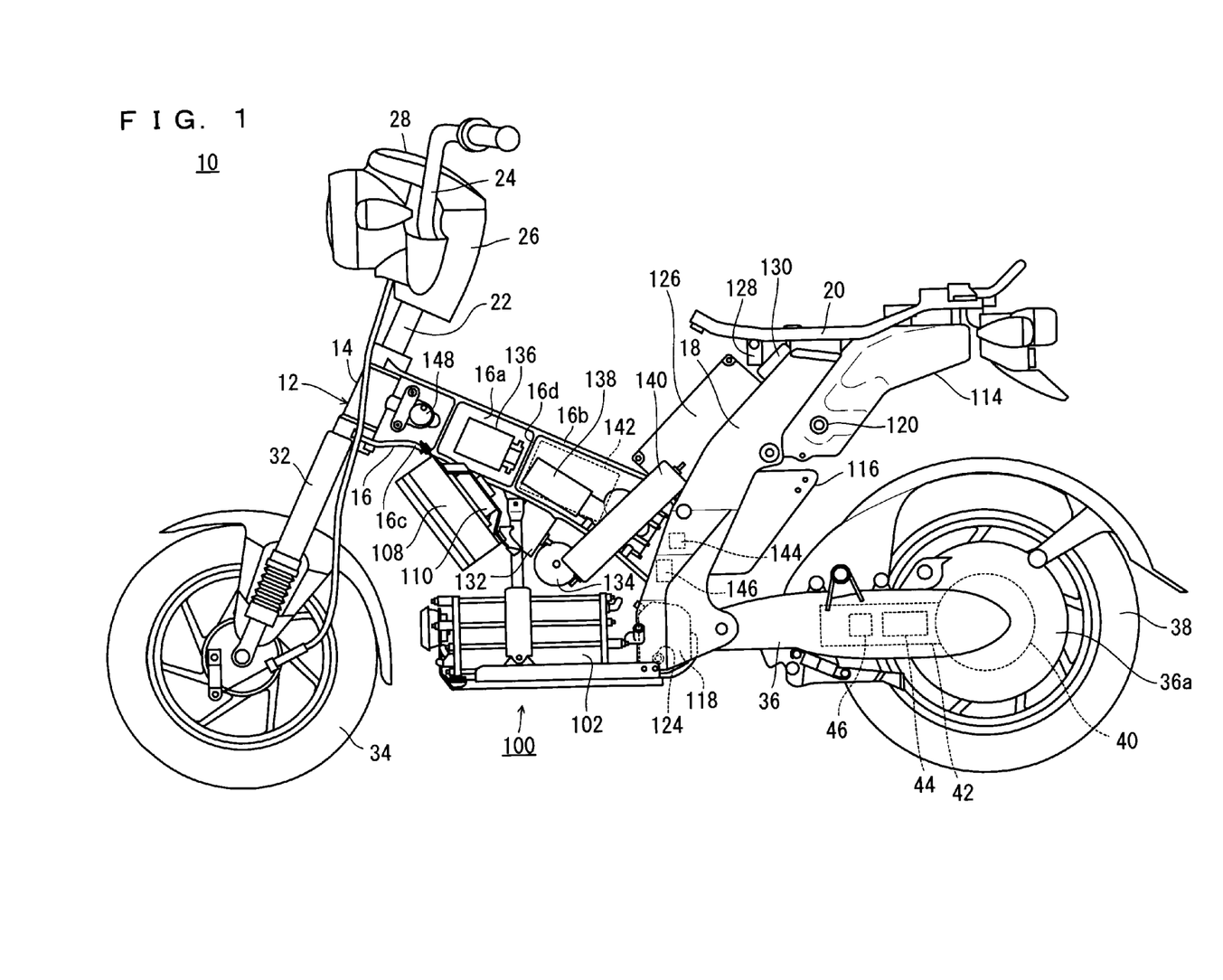
FIG. 1 is a left side view of a motorbike according to a preferred embodiment of the present invention.

Referring to FIG. 1, the motorbike 10 preferably includes a vehicle frame 12. The vehicle frame 12 has a head pipe 14, a front frame 16 which has an I-shaped vertical section and extends in a rearward and downward direction from the head pipe 14, and a rear frame 18 which is connected with a rear end of the front frame 16 and rises in a rearward and upward direction.

The front frame 16 preferably includes a plate member 16a which has a width in the vertical direction and extends in a rearward and downward direction, substantially perpendicularly to the lateral directions of the vehicle; flanges 16b, 16c which are located respectively at an upper end edge and a lower end edge of the plate member 16a, extend in a rearward and downward direction and have a width in the lateral directions; and reinforcing ribs 16d protruding from both surfaces of the plate member 16a. The reinforcing ribs 16d and the flanges 16b, 16c define storage walls, providing compartments on both surfaces of the plate member 16a defining storage spaces for components of the fuel cell system 100 to be described later.

The rear frame 18 preferably includes a pair of left and right plate members each having a width in the front and rear directions, extending in a rearward and upward direction, and sandwiching a rear end of the front frame 16. The pair of plate members of the rear frame 18 have their upper end portions provided with seat rails 20 fixed thereto, for installation of an unillustrated seat. Note that FIG. 1 shows the left plate member of the rear frame 18.

A steering shaft 22 is pivotably inserted in the head pipe 14. A handle support 26 is provided at an upper end of the steering shaft 22, to which a handle 24 is fixed. The handle support 26 has an upper end provided with a display/operation board 28.

Figure 3:
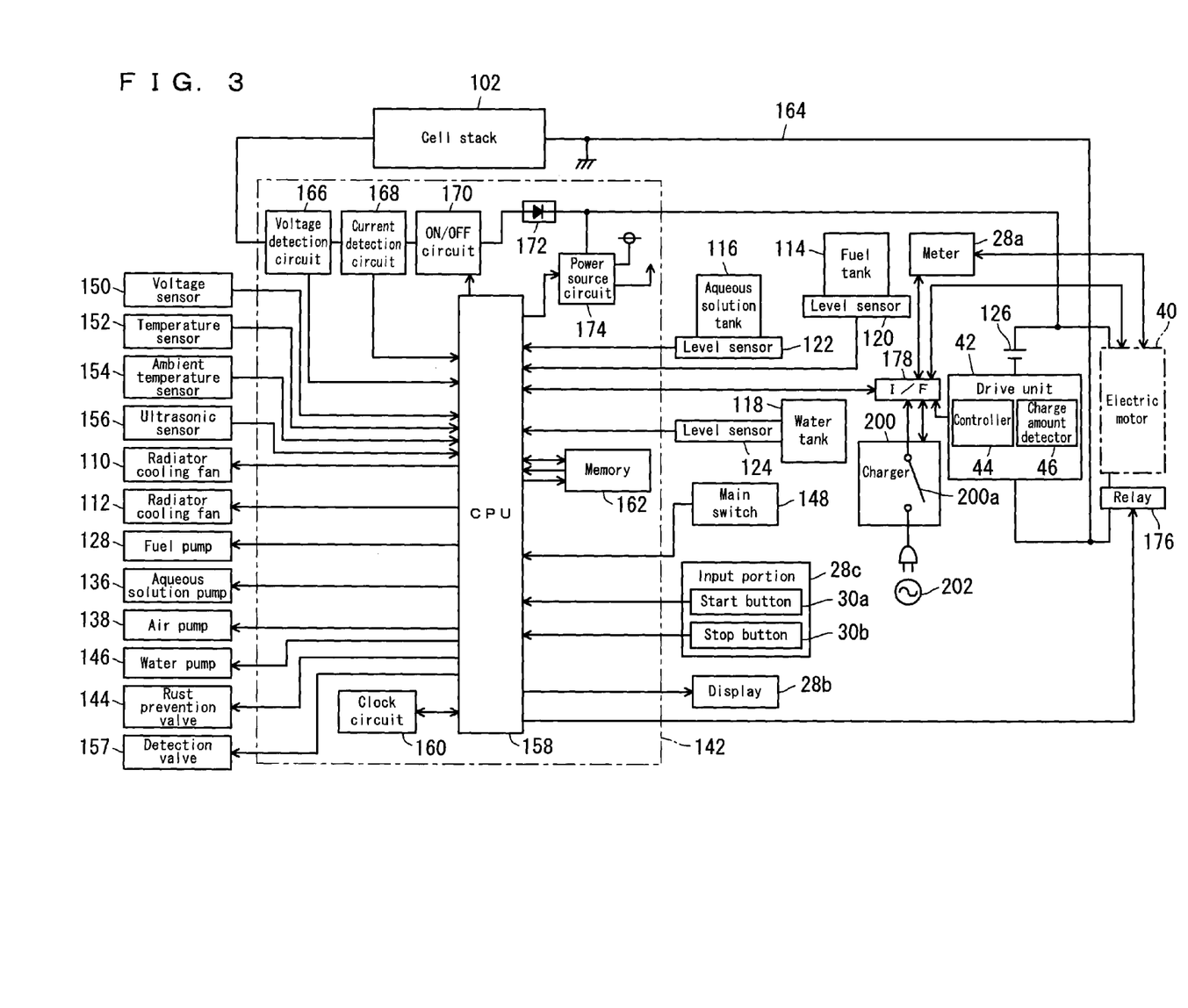
FIG. 3 is a block diagram showing an electric configuration of the fuel cell system.

Referring also to FIG. 3, the display/operation board 28 is an integrated dashboard including a meter 28a for measuring and displaying various data concerning an electric motor 40 (to be described later); a display 28b provided by, e.g., a liquid crystal display for providing the driver with a variety of information concerning the ride; and an input portion 28c for inputting a variety of commands and data. The input portion 28c includes a start button 30a for issuing a power generation start command of a fuel cell stack (hereinafter simply called cell stack) 102 and a stop button 30b for issuing a power generation stop command of the cell stack 102.

As shown in FIG. 1, a pair of left and right front forks 32 extend from a bottom end of the steering shaft 22. Each of the front forks 32 includes a bottom end supporting a front wheel 34 rotatably.

The rear frame 18 includes a lower end which pivotably supports a swing arm (rear arm) 36. The swing arm 36 has a rear end 36a incorporating an electric motor 40 of an axial gap type, for example, which is connected with the rear wheel 38 to rotate the rear wheel 38. The swing arm 36 also incorporates a drive unit 42 which is electrically connected with the electric motor 40. The drive unit 42 includes a motor controller 44 for controlling the rotating drive of the electric motor 40, and a charge amount detector 46 for detecting the amount of charge in the secondary battery 126 (to be described later).

The motorbike 10 as described is equipped with a fuel cell system 100, with its constituent members being disposed along the vehicle frame 12. The fuel cell system 100 generates electric energy for driving the electric motor 40 and other system components.

Hereinafter, the fuel cell system 100 will be described with reference to FIG. 1 and FIG. 2.

The fuel cell system 100 is preferably a direct methanol fuel cell system which uses methanol (an aqueous solution of methanol) directly without reformation, for generation of electric energy (power generation).

The fuel cell system 100 includes the cell stack 102. As shown in FIG. 1, the cell stack 102 is suspended from the flange 16c, and is disposed below the front frame 16.

Figure 2:
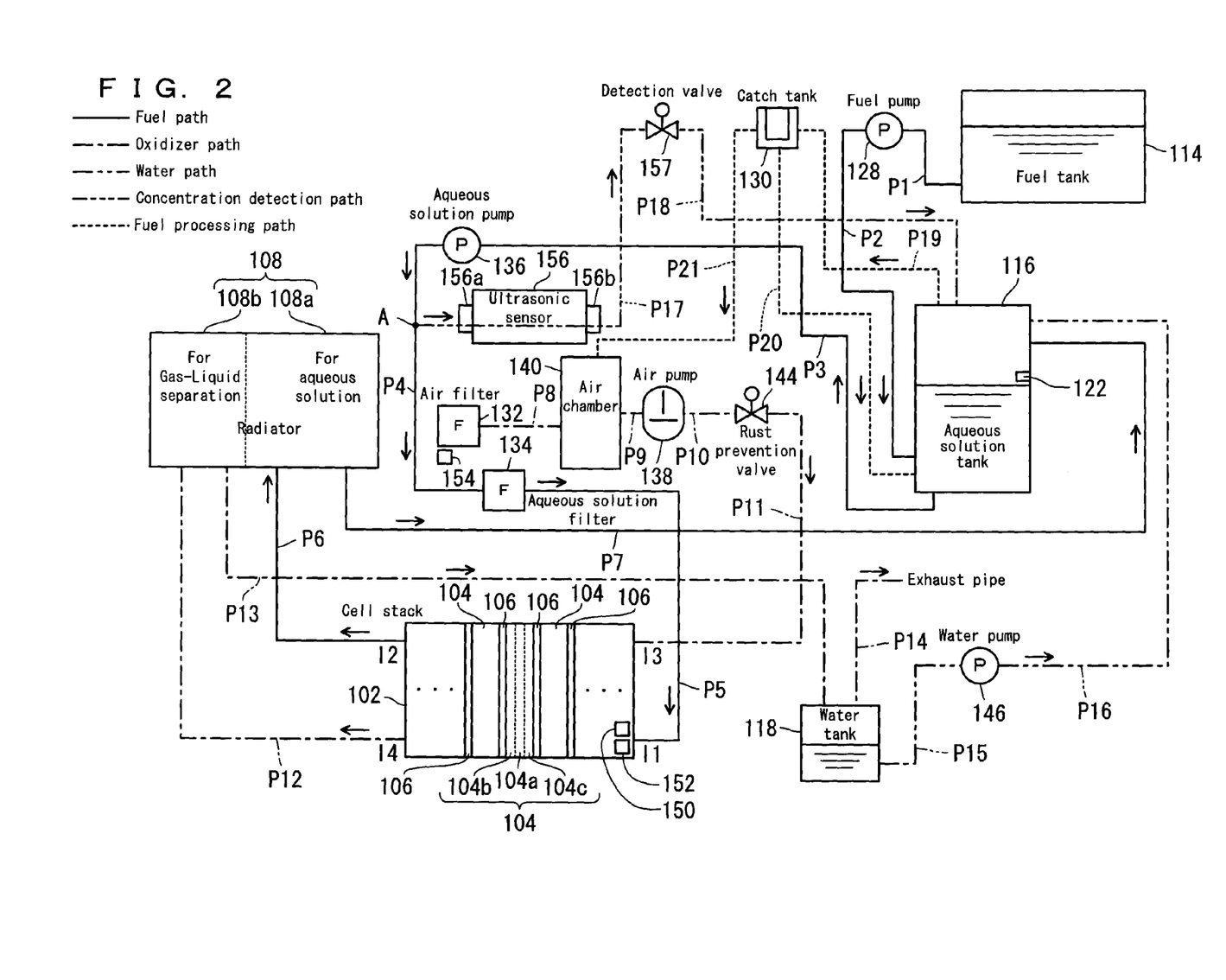
FIG. 2 is a system diagram showing piping in a fuel cell system.

As shown in FIG. 2, the cell stack 102 includes a plurality of fuel cells (individual fuel cells) 104 layered (stacked) in alternation with separators 106. Each fuel cell 104 is capable of generating electric power through electrochemical reactions between hydrogen ion based on methanol and oxygen. Each fuel cell 104 in the cell stack 102 includes an electrolyte film 104a, such as a solid polymer film, for example, and a pair of an anode (fuel electrode) 104b and a cathode (air electrode) 104c opposed to each other, with the electrolyte film 104a in between. The anode 104b and the cathode 104c each preferably include a platinum catalyst layer provided on the side closer to the electrolyte film 104a.

As shown in FIG. 1, a radiator unit 108 is disposed below the front frame 16, above the cell stack 102.

As shown in FIG. 2, the radiator unit 108 includes integrally therein, a radiator 108a for aqueous solution and a radiator 108b for gas-liquid separation. On a back side of the radiator unit 108, there is a fan 110 provided to cool the radiator 108a, and there is another fan 112 (See FIG. 3) provided to cool the radiator 108b. In FIG. 1, the radiators 108a and 108b are disposed side by side, with one on the left-hand side and the other on the right-hand side, and the figure shows the fan 110 for cooling the left-hand side radiator 108a.

A fuel tank 114, an aqueous solution tank 116 and a water tank 118 are disposed in this order from top to down, between the pair of plate members in the rear frame 18.

The fuel tank 114 contains a methanol fuel (high concentration aqueous solution of methanol) having a high concentration level (containing methanol at approximately 50 wt %, for example) which is used as fuel for the electrochemical reaction in the cell stack 102. The aqueous solution tank 116 contains aqueous methanol solution, which is a solution of the methanol fuel from the fuel tank 114 diluted to a suitable concentration (containing methanol at approximately 3 wt %, for example) for the electrochemical reaction in the cell stack 102. The water tank 118 contains water which is produced as a result of the electrochemical reactions in the cell stack 102.

The fuel tank 114 is provided with a level sensor 120 while the aqueous solution tank 116 is provided with a level sensor 122, and the water tank 118 is provided with a level sensor 124. The level sensors 120, 122 and 124 are float sensors each having an unillustrated float for example, and detect the height of liquid (liquid level) in the respective tanks by the position of the moving float.

In front of the fuel tank 114 and above the front frame 16 is the secondary battery 126. The secondary battery 126 stores the electric power from the cell stack 102, and supplies the electric power to the electric components in response to commands from a controller 142 (to be described later). Above the secondary battery 126, a fuel pump 128 is disposed. Further, a catch tank 130 is disposed in front of the fuel tank 114, i.e., above and behind the secondary battery 126.

An air filter 132 is disposed in a space surrounded by the front frame 16, the cell stack 102 and the radiator unit 108 for removing impurities such as dust contained in gas. Behind and below the air filter 132, an aqueous solution filter 134 is disposed.

An aqueous solution pump 136 and an air pump 138 are housed in the storage space on the left side of the front frame 16. On the left side of the air pump 138 is an air chamber 140.

The controller 142, a rust prevention valve 144 and a water pump 146 are disposed in the storage space on the right side of the front frame 16.

A main switch 148 is provided in the front frame 16, penetrating the storage space in the front frame 16 from right to left. Turning on the main switch 148 provides an operation start command to the controller 142 and turning off the main switch 148 provides an operation stop command to the controller 142.

As shown in FIG. 2, the fuel tank 114 and the fuel pump 128 are connected with each other by a pipe P1. The fuel pump 128 and the aqueous solution tank 116 are connected with each other by a pipe P2. The aqueous solution tank 116 and the aqueous solution pump 136 are connected with each other by a pipe P3. The aqueous solution pump 136 and the aqueous solution filter 134 are connected with each other by a pipe P4. The aqueous solution filter 134 and the cell stack 102 are connected with each other by a pipe P5. The pipe P5 is connected with an anode inlet I1 of the cell stack 102. By driving the aqueous solution pump 136, aqueous methanol solution is supplied to the cell stack 102. A voltage sensor 150 is provided near the anode inlet I1 of the cell stack 102 in order to detect concentration information, which reflects the concentration of aqueous methanol solution (the ratio of methanol in the aqueous methanol solution) supplied to the cell stack 102, using an electrochemical characteristic of the aqueous methanol solution. The voltage sensor 150 detects an open-circuit voltage of the fuel cell (fuel cells) 104, and the detected voltage value defines electrochemical concentration information. Based on the concentration information, the controller 142 detects the concentration of the aqueous methanol solution supplied to the cell stack 102. Near the anode inlet I1 of the cell stack 102, a temperature sensor 152 is provided in order to detect the temperature of aqueous methanol solution supplied to the cell stack 102.

The cell stack 102 and the aqueous solution radiator 108a are connected with each other by a pipe P6, and the radiator 108a and the aqueous solution tank 116 are connected with each other by a pipe P7. The pipe P6 is connected with an anode outlet I2 of the cell stack 102.

The pipes P1 through P7 serve primarily as a flow path for fuel.

The air filter 132 and the air chamber 140 are connected with each other by a pipe P8. The air chamber 140 and the air pump 138 are connected with each other by a pipe P9, the air pump 138 and the rust prevention valve 144 are connected with each other by a pipe P10 whereas the rust prevention valve 144 and the fuel cell stack 102 are connected with each other by a pipe P11. The pipe P11 is connected with a cathode inlet I3 of the cell stack 102. When the fuel cell system 100 generates power, the rust prevention valve 144 is opened. By driving the air pump 138 under this condition, air containing oxygen is introduced from outside. The rust prevention valve 144 is closed when the fuel cell system 100 is stopped, prevents backflow of water vapor into the air pump 138, and thereby prevents rusting of the air pump 138. An ambient temperature sensor 154 is provided near the air filter 132 to detect an ambient temperature.

The cell stack 102 and the gas-liquid separation radiator 108b are connected with each other by a pipe P12. The radiator 108b and the water tank 118 are connected with each other by a pipe P13. The water tank 118 is provided with a pipe (an exhaust pipe) P14.

The pipes P8 through P14 serve primarily as a flow path for oxidizer.

The water tank 118 and the water pump 146 are connected with each other by a pipe P15 whereas the water pump 146 and the aqueous solution tank 116 are connected with each other by a pipe P16.

The pipes P15, P16 serve as a flow path for water.

Also, a pipe P17 is connected with a branching section A of the pipe P4 so that part of aqueous methanol solution which flows through the pipe P4 will flow in. An ultrasonic sensor 156 is attached to the pipe P17. The ultrasonic sensor 156 is arranged to detect the methanol concentration of aqueous methanol solution, based on the principle that a travel time (propagation speed) of ultrasonic waves changes depending on the concentration. The ultrasonic sensor 156 includes a transmitter unit 156a and a receiver unit 156b. An ultrasonic wave transmitted from the transmitter unit 156a is received by the receiver unit 156b to detect an ultrasonic wave travel time in the pipe P17, and a voltage value which corresponds to the travel time is taken as physical concentration information. The controller 142 detects the concentration of the aqueous methanol solution in the pipe P17 based on the concentration information.

A detection valve 157 is connected with the pipe P17. The detection valve 157 and the aqueous solution tank 116 are connected with each other by a pipe P18. When detecting the concentration, the detection valve 157 is closed to stop the flow of aqueous methanol solution in the pipe P17. After the detection of the concentration, the detection valve 157 is opened to release the aqueous methanol solution, whose concentration has been detected, back to the aqueous solution tank 116.

The pipes P17, P18 serve as a flow path primarily for concentration detection.

The aqueous solution tank 116 and the catch tank 130 are connected with each other by pipes P19, P20. The catch tank 130 and the air chamber 140 are connected with each other by a pipe P21.

The pipes P19 through P21 constitute a flow path primarily for fuel processing.

Next, reference will be made to FIG. 3, to cover an electrical configuration of the fuel cell system 100.

The controller 142 of the fuel cell system 100 preferably includes a CPU 158 for performing necessary calculations and controlling operations of the fuel cell system 100; a clock circuit 160 for providing the CPU 158 with a current time; a memory 162 provided by, e.g., an EEPROM for storing programs and data for controlling the operations of the fuel cell system 100 as well as calculation data, etc.; a voltage detection circuit 166 for detecting a voltage in an electric circuit 164 to connect the cell stack 102 with an electric motor 40 which drives the motorbike 10; an electric current detection circuit 168 for detecting an electric current which passes through the fuel cells 104, i.e., the cell stack 102; an ON/OFF circuit 170 for opening and closing the electric circuit 164; a diode 172 provided in the electric circuit 164; and a power source circuit 174 for providing the electric circuit 164 with a predetermined voltage.

The CPU 158 of the controller 142 as described above is supplied with detection signals from the level sensors 120, 122 and 124, as well as detection signals from the voltage sensor 150, the temperature sensor 152, the ambient temperature sensor 154 and the ultrasonic sensor 156. The CPU 158 detects the amount of liquid in each of the tanks, based on relevant detection signals from the level sensors 120, 122 and 124 which reflect respective liquid levels.

The CPU 158 is also supplied with input signals from the main switch 148 for turning ON or OFF the electric power, and input signals from the start button 30a and the stop button 30b in the input portion 28c. Further, the CPU 158 is supplied with detection signals from the charge amount detector 46.

Further, the CPU 158 is supplied with voltage values detected by the voltage detection circuit 166 and electric current values detected by the electric current detection circuit 168. The CPU 158 calculates an output from the cell stack 102, using the voltage values and electric current values supplied.

The CPU 158 controls system components such as the fuel pump 128, the aqueous solution pump 136, the air pump 138, the water pump 146, the fans 110, 112, the rust prevention valve 144 and the detection valve 157. The CPU 158 also controls the display 28b which displays various kinds of information for the driver of the motorbike 10.

The cell stack 102 is connected with the secondary battery 126 and the drive unit 42. The secondary battery 126 and the drive unit 42 are connected with the electric motor 40 via an ON and OFF relay 176. The secondary battery 126 complements the output from the cell stack 102, by being charged with electric power from the cell stack 102 and discharging the electricity to supply power to the electric motor 40, the system components, etc.

The electric motor 40 is connected with the meter 28a for measuring various data concerning the electric motor 40. The data and status information of the electric motor 40 obtained by the meter 28a are supplied to the CPU 158 via the interface circuit 178.

In addition, a charger 200 is connectable with the interface circuit 178. The charger 200 is connectable with an external power source (commercial power source) 202. While the charger 200 is connected, a charger connection signal is sent to the CPU 158 via the interface circuit 178. The charger 200 has a switch 200a which can be turned ON/OFF by the CPU 158.

Figure 4:
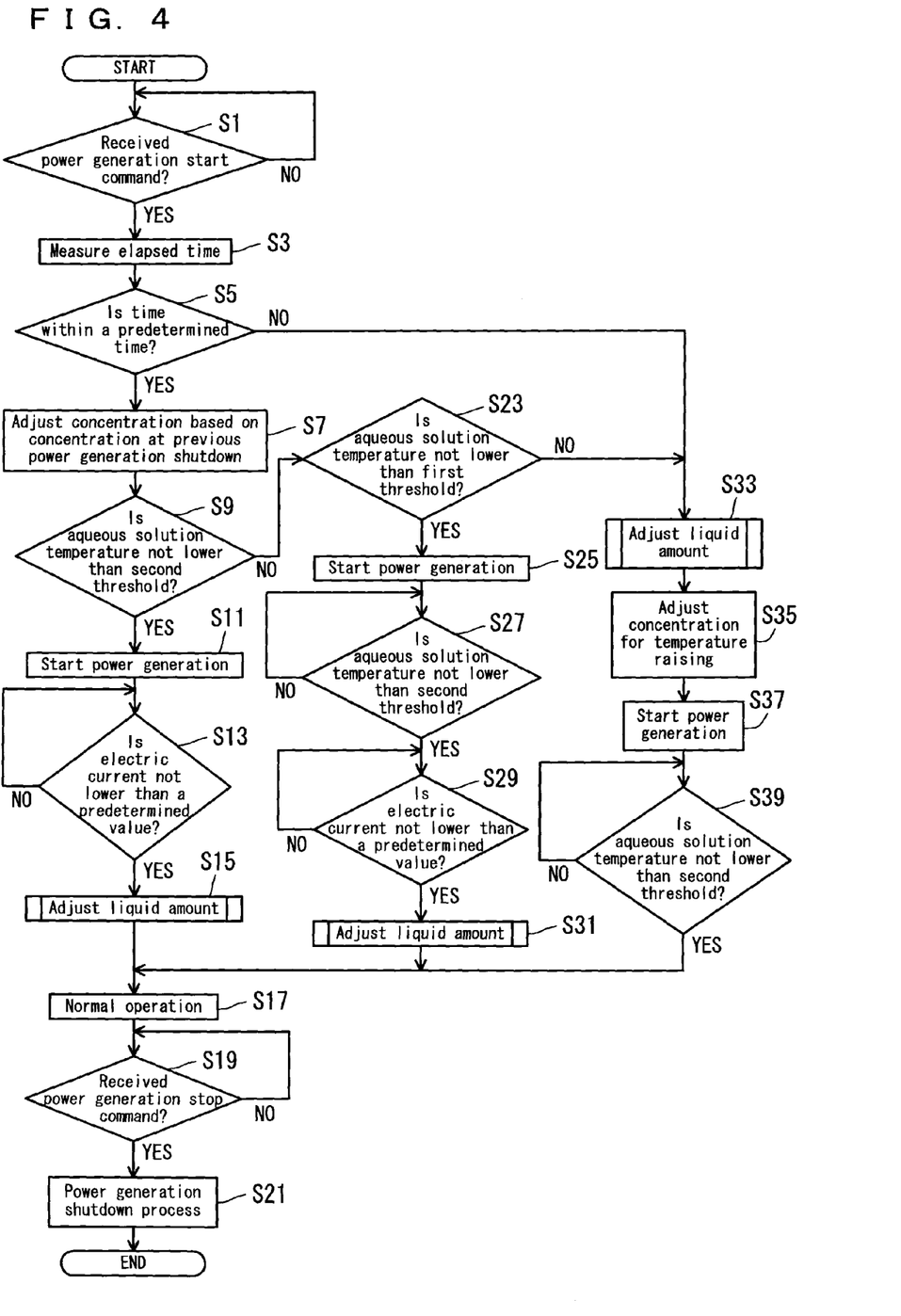
FIG. 4 is a flowchart showing an example of operation of a preferred embodiment of the present invention.
Figure 5:
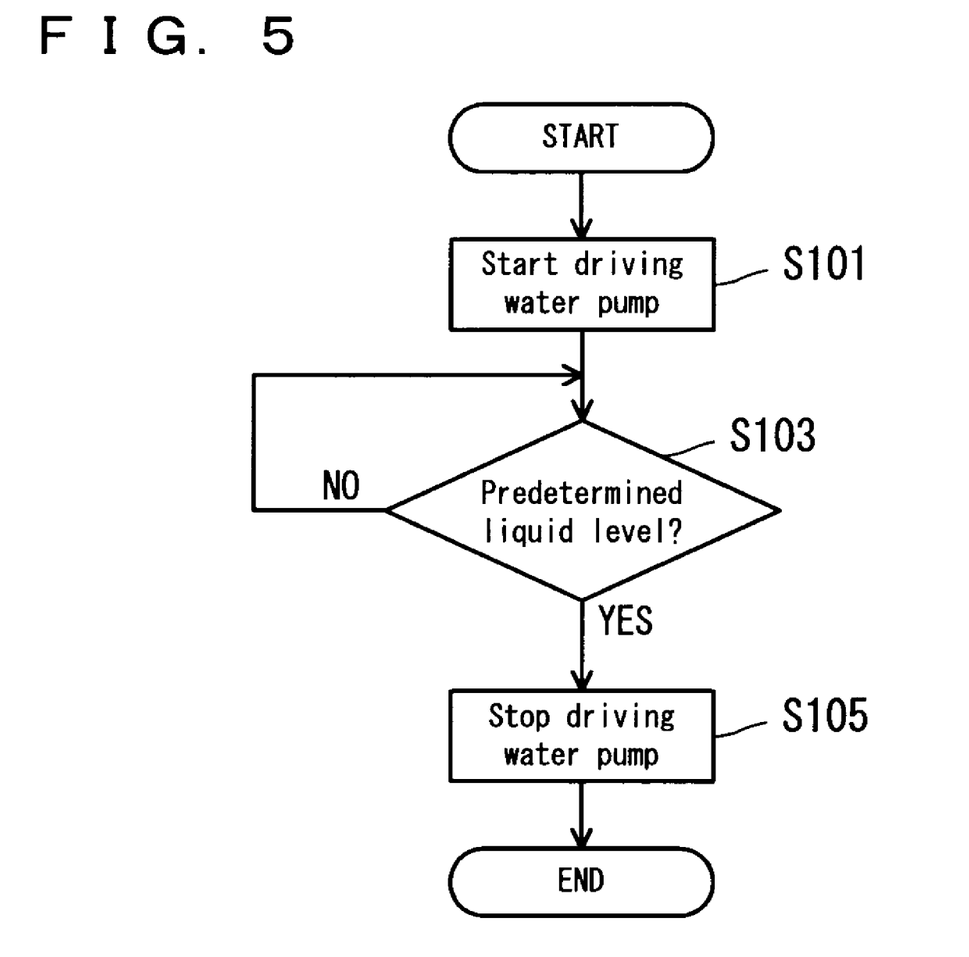
FIG. 5 is a flowchart showing an example of liquid amount adjusting operation.

The memory, i.e., the memory 162 stores programs for performing operations shown in FIG. 4 and FIG. 5, conversion information for converting electrochemical concentration information (open-circuit voltage) obtained by the voltage sensor 150 into a concentration, conversion information for converting physical concentration information (voltage which reflects propagation speed) obtained by the ultrasonic sensor 156 into a concentration, a predetermined liquid level for comparison with the liquid level in the aqueous solution tank 116 detected by the level sensor 122, a first and a second threshold values for comparison with the temperature of aqueous methanol solution detected by the temperature sensor 152, a predetermined electric current value for comparison with the electric current value detected by the electric current detection circuit 168, a previous power generation shutdown time obtained by the clock circuit 160, the concentration of the aqueous methanol solution detected by the voltage sensor 150 at the time of previous power generation shutdown, and calculation data, etc.

In the present preferred embodiment, the aqueous solution tank 116 defines the aqueous solution container, the water pump 146 defines the water supply, the CPU 158 defines the controller, the level sensor 122 defines the liquid level detector, the temperature sensor 152 defines the temperature detector, and the start button 30a defines the instruction unit. The CPU 158 also functions as the instruction unit. The bubble detector preferably includes the CPU 158 and the electric current detection circuit 168. The time measuring unit includes the CPU 158, the clock circuit 160 and the memory 162. The concentration detector includes the voltage sensor 150 and the CPU 158. The concentration adjusting unit includes the fuel pump 128, the water pump 146 and the CPU 158.

Next, description will cover a basic operation of the fuel cell system 100.

When the main switch 148 is turned ON, the fuel cell system 100 starts the controller 142 and commences its operation. After the controller 142 is started, and when the amount of charge in the secondary battery 126 becomes not greater than a predetermined amount (for example, charge rate becomes not greater than about 40%) or the start button 30a is pressed, electricity from the secondary battery 126 begins to drive the system components such as the aqueous solution pump 136 and the air pump 138, and thus power generation is started in the cell stack 102. Meanwhile, the ON/OFF circuit 170 is turned ON and the relay 176 is switched, to connect the electric motor 40 with the cell stack 102 and the secondary battery 126.

After the power generation is started, the power generation in the cell stack 102 is stopped if the secondary battery 126 has been fully charged or the stop button 30b has been pressed.

Referring now to FIG. 2, aqueous methanol solution in the aqueous solution tank 116 is sent via the pipes P3, P4 to the aqueous solution filter 134 as the aqueous solution pump 136 is driven. The aqueous solution filter 134 removes impurities and so on from the aqueous methanol solution, then the aqueous methanol solution is sent through the pipe P5 and the anode inlet I1, directly to the anode 104b in each of the fuel cells 104 which constitute the cell stack 102.

Meanwhile, gas (primarily containing carbon dioxide, vaporized methanol and water vapor) in the aqueous solution tank 116 is supplied via the pipe P19 to the catch tank 130. The methanol vapor and water vapor are cooled in the catch tank 130, and the aqueous methanol solution obtained in the catch tank 130 is returned via the pipe P20 to the aqueous solution tank 116. On the other hand, gas (containing carbon dioxide, non-liquefied methanol and water vapor) in the catch tank 130 is supplied via the pipe P21 to the air chamber 140.

On the other hand, as the air pump 138 is driven, air is introduced through the air filter 132 and flows through the pipe P8 into the air chamber 140 where noise is silenced. The air which was introduced to the air chamber 140 and gas from the catch tank 130 flow via the pipe P9 to the air pump 138, and then through the pipe P10, the rust prevention valve 144, the pipe P11 and the cathode inlet I3, into the cathode 104c in each of the fuel cells 104 which constitute the cell stack 102.

At the anode 104b in each fuel cell 104, methanol and water in the supplied aqueous methanol solution chemically react with each other to produce carbon dioxide and hydrogen ions. The produced hydrogen ions flow to the cathode 104c via the electrolyte film 104a, and electrochemically react with oxygen in the air supplied to the cathode 104c, to produce water (water vapor) and electric energy. Thus, power generation is performed in the cell stack 102. The electricity from the cell stack 102 is used to charge the secondary battery 126, to drive the motorbike 10 and so on. The temperature of the cell stack 102 is increased by the heat associated with the electrochemical reactions. The output of the cell stack 102 increases as the temperature rises, and the cell stack 102 becomes able to perform normal constant power generation at approximately 50° C. In other words, the fuel cell system 100 becomes ready to shift to normal operation for constant power generation when the temperature of the cell stack 102 becomes not lower than about 50° C. The temperature of the cell stack 102 can be checked by the temperature of aqueous methanol solution detected by the temperature sensor 152.

The temperatures of carbon dioxide produced at the anode 104b in each fuel cell 104 and of aqueous methanol solution which includes unused methanol are increased by the heat associated with the electrochemical reaction. The carbon dioxide and the aqueous methanol solution flow from the anode outlet I2 of the cell stack 102, through the pipe P6 into the radiator 108a, where they are cooled. The cooling of the carbon dioxide and the methanol is facilitated by driving the fan 110. The carbon dioxide and the aqueous methanol solution which have been cooled then flow through the pipe P7, and return to the aqueous solution tank 116. In other words, aqueous methanol solution in the aqueous solution tank 116 circulates to the cell stack 102 in circulatory supply. During power generation, bubbles are produced in the aqueous methanol solution in the aqueous solution tank 116 due to the return flow of carbon dioxide and aqueous methanol solution from the cell stack 102, the supply flow of methanol fuel from the fuel tank 114, and supply flow of water from the water tank 118. The float of the level sensor 122 moves up with the bubbles, and therefore the liquid level detected by the level sensor 122 during power generation is higher than the actual liquid level of the aqueous methanol solution. In other words, during power generation, a liquid level which is inflated by bubbles is detected as the liquid level in the aqueous solution tank 116. For this reason, the amount of the liquid in the aqueous solution tank 116 is recognized as being greater than the actual amount of the liquid during power generation.

Meanwhile, most of the water vapor produced on the cathode 104c in each fuel cell 104 is liquefied and discharged in the form of water from the cathode outlet I4 of the cell stack 102, with saturated water vapor being discharged in the form of gas. The water vapor which was discharged from the cathode outlet I4 is supplied via the pipe P12 to the radiator 108b, where it is cooled and its portion is liquefied as its temperature decreases to or below the dew point. The liquefying operation of the water vapor by the radiator 108b is facilitated by operation of the fan 112. Discharge from the cathode outlet I4, which contains water (liquid water and water vapor), carbon dioxide and unused air, is supplied via the pipe P12, the radiator 108b and the pipe P13, to the water tank 118 where water is collected, and thereafter, discharged to outside via the pipe P14.

At the cathode 104c in each fuel cell 104, the vaporized methanol from the catch tank 130 and methanol which has moved to the cathode 104c due to crossover react with oxygen in the platinum catalyst layer, thereby being decomposed to harmless substances of water and carbon dioxide. The water and carbon dioxide which are produced from the methanol are discharged from the cathode outlet I4, and supplied to the water tank 118 via the radiator 108b. Further, water which has moved due to water crossover to the cathode 104c in each fuel cell 104 is discharged from the cathode outlet I4, and supplied to the water tank 118 via the radiator 108b.

The water in the water tank 118 is recycled appropriately by a pumping operation of the water pump 146, through the pipes P15, P16 to the aqueous solution tank 116. Also, methanol fuel in the fuel tank 114 is supplied appropriately by a pumping operation of the fuel pump 128, through the pipes P1, P2, to the aqueous solution tank 116. The concentration adjustment of the aqueous methanol solution is performed based on the concentration of aqueous methanol solution in the aqueous solution tank 116 detected by using the voltage sensor 150 or the ultrasonic sensor 156.

In the voltage sensor 150, the open-circuit voltage difference between two different concentrations becomes greater as the temperature of the aqueous methanol solution becomes higher, because chemical changes are more active at a higher temperature of the aqueous methanol solution. On the other hand, in the ultrasonic sensor 156, the voltage difference between two different concentrations becomes greater as the temperature of the aqueous methanol solution becomes lower, because difference in ultrasonic propagation speed in methanol and in water becomes greater at a lower temperature of the aqueous methanol solution. In other words, when the temperature is relatively high, use of the voltage sensor 150 to detect the concentration of the aqueous methanol solution leads to a higher detection accuracy, and when the temperature is relatively low, use of the ultrasonic sensor 156 to detect the concentration of the aqueous methanol solution leads to a higher detection accuracy.

In the present preferred embodiment, the voltage sensor 150 is used to detect the concentration of the aqueous methanol solution if the temperature of aqueous methanol solution is not lower than the first threshold value (about 45° C., for example) stored in the memory 162, whereas the ultrasonic sensor 156 is used to detect the concentration of the aqueous methanol solution if the temperature of aqueous methanol solution is lower than the first threshold value.

Next, a main operation of the fuel cell system 100 will be described with reference to FIG. 4.

First, in Step S1, the CPU 158 is provided with a power generation start command when the amount of charge in the secondary battery 126 becomes not greater than a predetermined amount or the start button 30a is pressed, thereupon the CPU 158 measures the amount of time from the previous power generation shutdown to the current power generation start command (hereinafter called elapsed time) (Step S3).

In Step S3, the elapsed time is obtained by the CPU 158 through a calculation of a difference between the previous power generation shutdown time which is stored in the memory 162 and the power generation start command issuance time which is obtained from the clock circuit 160.

Then, the CPU 158 determines whether or not the elapsed time is within a predetermined time (about two hours, for example) (Step S5). If the elapsed time is within the predetermined time, the CPU 158 drives at least one of the fuel pump 128 and the water pump 146, thereby adjusting the concentration of aqueous methanol solution in the aqueous solution tank 116 to a value (approximately 3 wt %) suitable for the electrochemical reactions (power generation) in the cell stack 102 (Step S7).

As will be described later, the concentration of aqueous methanol solution in the aqueous solution tank 116 is decreased to approximately 0.5 wt % when power generation is stopped. This is to reduce the amount of methanol crossover to the cathode 104c after the power generation is stopped. In Step S7, in order to bring the aqueous methanol solution in the aqueous solution tank 116 back to the concentration (approximately 3 wt %) which is suitable for the power generation, the fuel pump 128 is driven to supply methanol fuel to the aqueous solution tank 116 based on the concentration information stored in the memory 162 at the time of previous power generation shutdown.

Then, the temperature sensor 152 detects the temperature of aqueous methanol solution, and the CPU 158 determines whether or not the result of detection by the temperature sensor 152 is not lower than a second threshold value (about 50° C., for example) stored in the memory 162 (Step S9). If the result of detection by the temperature sensor 152 is not lower than the second threshold value, the CPU 158 causes the cell stack 102 to start power generation (Step S11).

In Step S11, the CPU 158 drives the aqueous solution pump 136 and the air pump 138, to cause the cell stack 102 to start power generation. In the course of power generation in the cell stack 102, the concentration of the aqueous methanol solution which is in circulatory supply to the cell stack 102 decreases. Therefore, after Step S11, the CPU 158 drives the fuel pump 128 based on results of concentration detection of the aqueous methanol solution, and thereby supplies methanol fuel to the aqueous solution tank 116, in order to maintain the aqueous methanol solution at the concentration (approximately 3 wt %) achieved in the adjustment in Step S7. Since the target concentration for the aqueous methanol solution is as low as approximately 3 wt %, the amount of methanol fuel supplied to the aqueous solution tank 116 in order to maintain the concentration is small with respect to the amount of aqueous methanol solution in the aqueous solution tank 116. Therefore, the temperature of the aqueous methanol solution in the aqueous solution tank 116 changes very little.

Thereafter, the process waits until the electric current value detected by the electric current detection circuit 168 becomes not lower than a predetermined value (about 10 A, for example) (Step S13). When the electric current value detected by the electric current detection circuit 168 becomes not lower than the predetermined value, it is then possible to assume that the circulatory supply of aqueous methanol solution, i.e. power generation by the cell stack 102, has produced a sufficient amount of bubbles in the aqueous methanol solution in the aqueous solution tank 116. In other words, the electric current value detected by the electric current detection circuit 168 is obtained by the CPU 158 as information regarding presence of bubbles, and the predetermined electric current value (10 A) defines predetermined information indicating presence of sufficient amount of bubbles.

Then, when the electric current value detected by the electric current detection circuit 168 has become not lower than the predetermined value, i.e., if it is assumable that a sufficient amount of bubbles are present in the aqueous methanol solution in the aqueous solution tank 116, a liquid amount adjustment shown in FIG. 5 is performed in order to bring the liquid level in the aqueous solution tank 116 to a predetermined liquid level (Step S15). The predetermined liquid level is defined as a liquid level to be achieved by about 500 cc, for example, of the liquid in the aqueous solution tank 116.

As shown in FIG. 5, in the liquid amount adjustment, first, the water pump 146 is started by a command from the CPU 158 (Step S101). The water pump 146 is driven until the liquid level in the aqueous solution tank 116 detected by the level sensor 122 has achieved a predetermined liquid level (Step S103). The operation of the water pump 146 is stopped if the liquid level in the aqueous solution tank 116 has achieved the predetermined level by the supply of water (Step S105), whereupon the liquid amount adjustment is stopped. In other words, the liquid amount adjustment is stopped if it is determined that the amount of liquid in the aqueous solution tank 116 has reached a predetermined level (e.g., about 500 cc).

Referring back to FIG. 4, when the process goes from Step S13 to Step S15, a sufficient amount of bubbles are present in the aqueous methanol solution in the aqueous solution tank 116 in the course of circulatory supply of the aqueous methanol solution, i.e. in the course of power generation by the cell stack 102. Therefore, the liquid level detected by the level sensor 122 is higher by the amount of the bubbles, and the amount of the liquid in the aqueous solution tank 116 as determined by the system is greater than the actual amount of the liquid. For this reason, the amount of water supplied to the aqueous solution tank 116 in Step S15 is smaller than in the case where the liquid amount adjustment is performed before starting power generation (when bubbles are not present in aqueous methanol solution in the aqueous solution tank 116).

Then, the system shifts to normal operation (Step S17). On and after Step S17, the liquid amount adjustment is performed at a regular interval, and the concentration adjustment is performed at a regular interval so as to maintain the aqueous methanol solution at the concentration suitable for power generation. In other words, in normal operation, power generation by the cell stack 102 is performed while a control is provided on the amount of the liquid in the aqueous solution tank 116 and on the concentration of the aqueous methanol solution.

Thereafter, when the secondary battery 126 has become fully charged or if the stop button 30b is pressed to provide the CPU 158 with a power generation stopping command in Step S19, a power generation shutdown procedure is performed (Step S21).

In Step S21, the CPU 158 drives the water pump 146, whereby the concentration of the aqueous methanol solution in the aqueous solution tank 116 is decreased (approximately 0.5 wt %). Alternatively, power generation is continued until the concentration of the aqueous methanol solution comes as low. This step enables to reduce methanol crossover, i.e., the amount of methanol which moves to the cathode 104c, after the power generation is stopped. Then, the aqueous solution pump 136 and the air pump 138 are stopped, and power generation in the cell stack 102 stops. Thereafter, the time at which the aqueous solution pump 136 and the air pump 138 are stopped is recorded in the memory 162 as a previous power generation shutdown time. Also, the concentration of the aqueous methanol solution at that time point is detected by using the voltage sensor 150, and the detected value is stored in the memory 162 as a concentration at the previous power generation shutdown.

On the other hand, if Step S9 determines that the result of detection by the temperature sensor 152 is smaller than the second threshold value, the CPU 158 determines whether or not the result of detection by the temperature sensor 152 is not lower than the first threshold value (about 45° C.) (Step S23). If the result of detection by the temperature sensor 152 is not lower than the first threshold value, the CPU 158 performs the same operation as in Step S11, i.e., causes the cell stack 102 to start power generation before performing the liquid amount adjustment (Step S25). Thereafter, the process waits until the result of detection by the temperature sensor 152 becomes not lower than the second threshold value (about 50° C.) (Step S27). When the temperature of aqueous methanol solution becomes not lower than the second threshold value, the process waits, as in Step S13, until the electric current value detected by the electric current detection circuit 168 becomes not lower than the predetermined value (about 10 A) (Step S29). When the electric current value has become not lower than the predetermined value, the system performs the same procedure as in Step S15, i.e., performs the liquid amount adjustment shown in FIG. 5 (Step S31), and then goes to Step S17.

When the process goes from Step S29 to Step S31, a sufficient amount of bubbles are present in the aqueous methanol solution in the aqueous solution tank 116 as in the case where the process goes from Step S13 to Step S15. Therefore, the amount of water supplied to the aqueous solution tank 116 in Step S31 is also smaller than in the case where the liquid amount adjustment is performed before starting power generation.

On the other hand, if Step S23 determines that the result of detection by the temperature sensor 152 is smaller than the first threshold value, the liquid amount adjustment shown in FIG. 5 is performed before starting power generation (Step S33). The process also goes to Step S33 if Step S5 determines that the elapsed time has exceeded the predetermined time.

In Step S33, bubbles are not present in aqueous methanol solution in the aqueous solution tank 116 because the bubbles produced in aqueous methanol solution in the aqueous solution tank 116 disappear in a while after the previous power generation is stopped. Therefore, in Step S33, water supply to the aqueous solution tank 116 is started from the actual liquid level which does not contain bubbles, and the water supply is continued until the predetermined liquid level is reached. In other words, an uncompensated amount of water is supplied in Step S33. Therefore, the amount of water (the uncompensated amount of water) supplied in Step S33 is much greater than the amount of water supplied in Step S15 or S31.

Then, a concentration adjustment for temperature raising, which is to bring the aqueous methanol solution to a concentration for temperature raising, is performed (Step S35). In order to shorten a temperature rising time in the cell stack 102, it is effective to increase the concentration of the aqueous methanol solution. In Step S35, methanol fuel is supplied to the aqueous solution tank 116 so as to increase the concentration of aqueous methanol solution in the aqueous solution tank 116 to approximately 5 wt %, for example.

Then, the CPU 158 drives the aqueous solution pump 136 and the air pump 138, and with the increased concentration of the aqueous methanol solution, causes the cell stack 102 to start power generation (Step S37). Thereafter, the process waits until the result of detection by the temperature sensor 152 becomes not lower than the second threshold value (about 50° C.) (Step S39) while performing the liquid amount adjustment at a regular interval so that the amount of the liquid in the aqueous solution tank 116 is maintained at a predetermined amount, and also performing the concentration adjustment for temperature raising at a regular interval so that the aqueous methanol solution is maintained at the concentration for temperature raising. Since the liquid amount adjustment in Step S33 has brought the temperature of aqueous methanol solution in the aqueous solution tank 116 close to the ambient temperature, the waiting time in Step S39 is much longer than the waiting time in Step S13 or the waiting time in Step S27 or S29. Thereafter, when the temperature of the aqueous methanol solution becomes not lower than the second threshold value, the process goes to Step S17, where power generation is performed while the amount of liquid in the aqueous solution tank 116 is maintained at the predetermined level and the aqueous methanol solution is maintained at the concentration suitable for power generation.

It should be noted here that the process may determine an error and perform a separate procedure if the time (waiting time) before Step S13, S27, S29 or S39 determines YES is not shorter than a predetermined time.

According to the fuel cell system 100 as described, it is possible to perform a liquid amount adjustment when bubbles are present in aqueous methanol solution in the aqueous solution tank 116. In other words, it is possible to supply water to the aqueous solution tank 116 when bubbles are present in aqueous methanol solution in the aqueous solution tank 116. By supplying water when bubbles are present as has been described, it becomes possible to reduce the amount of water to be supplied to the aqueous solution tank 116 in order to bring the liquid level in the aqueous solution tank 116 to a predetermined liquid level (a target liquid level) as compared to a case where water is supplied when bubbles are not present. Therefore, it becomes possible to reduce changes in the state of aqueous methanol solution as compared to the case where water is supplied when bubbles are not present, and thus it becomes possible to shift to normal operation quickly if the state of aqueous methanol solution is ready or nearly ready for power generation.

Water supply to the aqueous solution tank 116 is not started until the electric current detected by the electric current detection circuit 168 reaches a predetermined value (about 10 A in the present preferred embodiment). Therefore, it is possible to start water supply after a sufficient amount of bubbles have been produced in aqueous methanol solution in the aqueous solution tank 116. Therefore, it is possible to further reduce the amount of water supplied to the aqueous solution tank 116 and to reduce state changes in the aqueous methanol solution more reliably.

When the electric current detected by the electric current detection circuit 168 reaches the predetermined value, a liquid amount adjustment is performed so as to restore a predetermined liquid level, whereby it becomes possible to prevent shortage of aqueous methanol solution in the aqueous solution tank 116 while reducing state changes in the aqueous methanol solution, which ensures smooth power generation in the cell stack 102. Further, by performing the liquid amount adjustment when a sufficient amount of bubbles are present, it becomes possible to prevent such a problem as an excessively high liquid level in the aqueous solution tank 116 which would be caused by water supply performed without presence of bubbles. In other words, it becomes possible to prevent bubbles from overflowing out of the aqueous solution tank 116, which can happen if bubbles are produced when the aqueous methanol solution level (the actual liquid level) is equal to the predetermined liquid level.

In a case where the elapsed time is short, or in a case where the aqueous methanol solution is warm, it is likely that the aqueous methanol solution is ready for power generation. Thus, when the elapsed time is within a predetermined time (for example, about two hours in the present preferred embodiment) and the temperature of the aqueous solution container is not lower than the first threshold value (for example, about 45° C. in the present preferred embodiment), the liquid amount adjustment is performed after a sufficient amount of bubbles are produced. As described, if the state of aqueous methanol solution is ready or nearly ready for power generation, it is possible to reduce state changes of the aqueous methanol solution by supplying water to the aqueous solution tank 116 when bubbles are present, and to shift to normal operation quickly. On the other hand, if the elapsed time exceeds a predetermined time or if the temperature of aqueous methanol solution is lower than the first threshold value, it is possible to shift to normal operation reliably by first performing the liquid amount adjustment and concentration adjustment for temperature raising, and then starting power generation thereafter.

If the elapsed time is within a predetermined time, it is possible to assume that the concentration at the time of previous power generation shutdown is equal to the current concentration of the aqueous methanol solution, and therefore it is simple, without making a detection of the concentration, to adjust the concentration of aqueous methanol solution to a value suitable for power generation in the cell stack 102 before starting power generation. As described, it is possible to improve power generation efficiency of the cell stack 102 by adjusting the concentration of aqueous methanol solution, and therefore it is possible to shift to normal operation more quickly.

Since the concentration adjustment can change the temperature of aqueous methanol solution, a result of detection by the temperature sensor 152 after the concentration adjustment but before starting power generation is used, whereby it becomes possible to appropriately determine whether or not to start power generation before the liquid amount adjustment.

According to preferred embodiments of the present invention, it becomes possible to supply water to the aqueous solution tank 116 when bubbles are present and it becomes possible to reduce state changes in aqueous methanol solution which is already adjusted suitably for power generation. Thus, preferred embodiments of the present invention are applicable to a fuel cell system 100 which has a potential problem of an excessively large amount of water supply to the aqueous solution tank 116 in the course of bringing the liquid level in the aqueous solution tank 116 to a predetermined liquid level.

According to the fuel cell system 100, it is possible to shift to normal operation quickly and to drive system components and the electric motor 40 quickly and stably, if the state of aqueous methanol solution is ready or nearly ready for power generation. Therefore, the fuel cell system 100 can be used suitably for a motorbike 10 in which a shorter time is desirable from start up to stable running operation.

It should be noted here that in the preferred embodiment described above, description was made of a case where liquid amount adjustment is not performed (the water pump 146 is not driven) until the electric current value detected by the electric current detection circuit 168 reaches a predetermined value (for example, about 10 A in the present preferred embodiment). However, the present invention is not limited to this. Specifically, even if the electric current value is smaller than a predetermined value, water may be supplied to the aqueous solution tank 116 by an amount which is smaller than the amount of water (uncompensated amount of water) to be supplied to bring the liquid level to a predetermined level when bubbles are not present. In this case, water supply is stopped at a level, for example, which is lower than the predetermined liquid level until the predetermined electric current value is reached. As another example, an increase in the liquid level to be caused by the bubbles may be added to the detected liquid level, so that water supply is stopped when the liquid level modified by the addition has reached the predetermined liquid level. Through these methods, it is possible to supply a smaller amount of water to the aqueous solution tank 116 than the uncompensated amount.

It is possible to reduce state changes in aqueous methanol solution by reducing the amount of water to supply (including the case where water is not supplied) as described.

In the preferred embodiment described above, description was made for a case where water is supplied to the aqueous solution tank 116 so as to bring the liquid level to a predetermined level. However, the liquid level (target liquid level) to be achieved by the water supply may be variable.

Further, in Step S5 of the operation shown in FIG. 4, power generation may be started before the liquid amount adjustment even if the result of detection by the temperature sensor 152 before starting power generation is smaller than the first threshold value, as long as the elapsed time is within a predetermined time. This arrangement makes it possible to supply water when bubbles are present in the aqueous solution tank 116 at the time of the liquid amount adjustment.

Further, power generation may be started before the liquid amount adjustment even if the elapsed time has exceeded a predetermined time, as long as the result of detection by the temperature sensor 152 before starting power generation is not lower than the first threshold value. This arrangement makes it possible to supply water when bubbles are present in the aqueous solution tank 116 at the time of the liquid amount adjustment.

It should be noted here that in the preferred embodiment described above, description was made for a case where the concentration of the aqueous methanol solution is lowered when power generation is stopped. The present invention is not limited to this however. For example, the concentration of the aqueous methanol solution does not have to be changed when power generation is stopped. In this case, it is not necessary to adjust the concentration of the aqueous methanol solution before starting power generation if the elapsed time is within a predetermined time.

Also, in the preferred embodiment described above, description was made for a case where the first threshold value was set to about 45° C., and the second threshold value was set to about 50° C. However, the present invention is not limited to this. The second threshold value may be set to any temperature as long as it is possible to shift to normal operation at or above that temperature. Likewise, the first threshold value may be set to any temperature as long as it is lower than the second threshold value and not lower than a normally anticipated ambient temperature.

Also, in the preferred embodiment described above, description was made for a case where the predetermined time is set to two hours. However, the present invention is not limited to this. Specifically, the predetermined time may be set to any value as long as the concentration of aqueous methanol solution in the aqueous solution tank 116 is not disturbed by crossover, evaporation, etc. and the amount of liquid in the aqueous solution tank 116 does not decrease excessively.

Further, in the preferred embodiment given above, description was made for a case where the predetermined electric current value which defines the predetermined information regarding presence of bubbles is set to about 10 A (amperes). However, the present invention is not limited to this. Specifically, the predetermined information may be defined by any electric current value as long as it indicates presence of a sufficient amount of bubbles.

It should be noted here that in the preferred embodiment described above, description was made for a case where the electric current value in the cell stack 102 is obtained as the information regarding presence of bubbles. However, the present invention is not limited to this.

For example, the information regarding presence of bubbles may be defined by a time from power generation start. By obtaining the time from power generation start as described, it is possible to assume a state of power generation in the cell stack 102, i.e., a state of bubbliness. In this case, the bubble detector includes the CPU 158 and the clock circuit 160. The time which defines the predetermined information may be a preset time or the value may be variable in accordance with the temperature of aqueous methanol solution. If the time which defines the predetermined information is varied depending on the temperature of aqueous methanol solution, the bubble detector further includes the temperature sensor 152.

Also, the information regarding presence of bubbles may be defined by a temperature difference in aqueous methanol solution between the time when power generation is started and the current time. By obtaining the temperature difference in aqueous methanol solution, it is possible to assume a state of power generation in the cell stack 102, i.e., a state of bubbliness. In this case, the bubble detector includes the temperature sensor 152 and the CPU 158.

Also, if methanol fuel is not supplied (added) to the aqueous solution tank 116 until the system has been shifted to normal operation, the information regarding presence of bubbles may be defined by a difference in the concentration of the aqueous methanol solution between the time of power generation start and the current time. By obtaining the concentration difference in aqueous methanol solution as described, it is possible to assume a state of power generation in cell stack 102, i.e., a state of bubbliness. In this case, the bubble detector includes the voltage sensor 150 and the CPU 158.

Further, if methanol fuel is supplied (added) to the aqueous solution tank 116 depending upon the amount of methanol consumption before the system is shifted to normal operation, the information regarding presence of bubbles may be defined by an amount of drive time of the fuel pump 128, i.e., the amount of supplied (added) fuel since power generation is started. By obtaining the amount of addition of methanol fuel as described, it is possible to assume a state of power generation in cell stack 102, i.e., a state of bubbliness. In this case, the bubble detector includes the CPU 158 and the clock circuit 160.

By using these pieces of information as the information regarding presence of bubbles, it is possible to detect bubbliness smoothly.

It should be noted here that the fuel cell system according to preferred embodiments of the present invention is applicable suitably not only to motorbikes but also to any transportation equipment such as automobiles and marine vessels.

In the preferred embodiments described above, description was made for a case where methanol is used as the fuel, and aqueous methanol solution is used as the aqueous fuel solution. However, the present invention is not limited to this, and the fuel may be provided by other alcoholic fuel such as ethanol, and the aqueous fuel solution may be provided by aqueous solution of the alcohol, such as aqueous ethanol solution.

Also, preferred embodiments of the present invention are applicable to stationary type fuel cell systems as long as a liquid fuel is used. Further, preferred embodiments of the present invention are applicable to portable type fuel cell systems for personal computers, portable devices, small electronic appliances, etc.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A fuel cell system comprising:
    a fuel cell;
    an aqueous solution container arranged to hold aqueous fuel solution to be supplied to the fuel cell;
    a water supply arranged to supply water to the aqueous solution container;
    a bubble detector arranged to detect information regarding presence of bubbles in the aqueous fuel solution in the aqueous solution container; and
    a controller arranged to control the water supply based on information obtained by the bubble detector.

2. The fuel cell system according to claim 1, further comprising a liquid level detector arranged to detect a liquid level in the aqueous solution container, wherein the controller controls the water supply, if the bubble detector obtains predetermined information regarding presence of the bubbles, so as to bring a liquid level in the aqueous solution container to a predetermined level based on a result of detection by the liquid level detector.

3. The fuel cell system according to claim 2, wherein the controller causes the water supply to start supplying the water to the aqueous solution container if the bubble detector obtains the predetermined information.

4. The fuel cell system according to claim 1, wherein the bubble detector obtains the information regarding presence of bubbles in the aqueous solution container based on at least one detection result of an output current from the fuel cell, an elapsed time since the fuel cell has started power generation, a temperature difference in the aqueous fuel solution from a power generation start, a concentration difference in the aqueous fuel solution from the power generation start, and an amount of a high-concentration fuel supplied to the aqueous solution container since the power generation start.

5. The fuel cell system according to claim 1, further comprising a temperature detector arranged to detect a temperature of the aqueous fuel solution, wherein the controller controls the water supply based on information obtained by the bubble detector if a result of detection by the temperature detector before a power generation start is not lower than a threshold value.

6. The fuel cell system according to claim 1, further comprising an instruction unit arranged to issue a power generation start command of the fuel cell, and a time measuring unit arranged to measure a time from a previous power generation shutdown to a current issuance of the power generation start command by the instruction unit, wherein the controller controls the water supply based on information obtained by the bubble detector if a result of measurement by the time measuring unit is within a predetermined time.

7. The fuel cell system according to claim 1, further comprising a concentration detector arranged to detect a concentration of the aqueous fuel solution, an instruction unit arranged to issue a power generation start command of the fuel cell, a time measuring unit arranged to measure a time from a previous power generation shutdown to a current issuance of the power generation start command by the instruction unit, and a concentration adjusting unit arranged to adjust a concentration of the aqueous fuel solution before a power generation start based on a result of detection by the concentration detector at the previous power generation shutdown if a result of time measurement by the time measuring unit is within a predetermined time.

8. The fuel cell system according to claim 7, further comprising a temperature detector arranged to detect a temperature of the aqueous fuel solution, wherein the controller controls the water supply based on information obtained by the bubble detector if a result of detection by the temperature detector after a concentration adjustment by the concentration adjusting unit but before a power generation start of the fuel cell is not lower than a threshold value.

9. Transportation equipment comprising the fuel cell system according to claim 1.

* * * * *